United States Patent
Payne

(10) Patent No.: US 10,528,075 B2
(45) Date of Patent: Jan. 7, 2020

(54) EMBEDDED CLOCK IN A COMMUNICATION SYSTEM

(71) Applicant: TEXAS INSTRUMENTS INCORPORATED, Dallas, TX (US)

(72) Inventor: Robert Floyd Payne, Lucas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/195,275

(22) Filed: Nov. 19, 2018

(65) Prior Publication Data

US 2019/0086947 A1 Mar. 21, 2019

Related U.S. Application Data

(60) Continuation of application No. 15/832,882, filed on Dec. 6, 2017, now Pat. No. 10,133,297, which is a division of application No. 14/983,776, filed on Dec. 30, 2015, now Pat. No. 9,864,398.

(51) Int. Cl.
*H04B 1/16* (2006.01)
*H04B 1/04* (2006.01)
*H04L 25/49* (2006.01)
*G06F 1/04* (2006.01)

(52) U.S. Cl.
CPC .............. *G06F 1/04* (2013.01); *H04B 1/04* (2013.01); *H04B 1/16* (2013.01); *H04L 25/4904* (2013.01); *H05K 999/99* (2013.01)

(58) Field of Classification Search
CPC ......... H04B 1/04; H04B 1/16; H04L 25/4904; H05K 999/99
USPC .................................................... 341/51–69
See application file for complete search history.

(56) References Cited

U.S. PATENT DOCUMENTS

| | | | |
|---|---|---|---|
| 5,047,735 A | * | 9/1991 | Meline ................. H03L 7/24 327/141 |
| 5,481,743 A | | 1/1996 | Baxter |
| 5,608,816 A | | 3/1997 | Kawahara et al. |
| 5,689,530 A | * | 11/1997 | Honaker, Jr. ......... H04J 3/0688 341/68 |
| 5,818,380 A | | 10/1998 | Ito et al. |
| 6,151,007 A | | 11/2000 | Kasai et al. |

(Continued)

*Primary Examiner* — Lam T Mai

(74) *Attorney, Agent, or Firm* — Michael A. Davis, Jr.; Charles A. Brill; Frank D. Cimino

(57) ABSTRACT

Transmitter circuitry transmits: a first voltage as the return-to-zero signal that is higher than a first positive threshold, the first voltage being decodable to a first order of data bits; a second voltage as a return-to-zero signal that is between a second positive threshold and the first positive threshold, the second voltage being decodable to a second order of the data bits, and the second positive threshold being lower than the first positive threshold; a third voltage as the return-to-zero signal that is between a first negative threshold and a second negative threshold, the third voltage being decodable to a third order of the data bits, and the second negative threshold being higher than the first negative threshold; and a fourth voltage as the return-to-zero signal that is lower than the first negative threshold, the fourth voltage being decodable to a fourth order of the data bits. Clock circuitry transitions a clock signal for the return-to-zero signal crossing the second positive threshold, and for the return-to-zero signal crossing the second negative threshold.

12 Claims, 5 Drawing Sheets

(56) References Cited

U.S. PATENT DOCUMENTS

| | | |
|---|---|---|
| 6,355,927 B1 | 3/2002 | Snyder |
| 6,624,766 B1 * | 9/2003 | Possley ................. H04L 7/0066 |
| | | 341/56 |
| 7,154,946 B1 * | 12/2006 | Katic .................... H04L 7/0058 |
| | | 375/233 |
| 8,502,713 B1 | 8/2013 | Lin |
| 8,781,022 B1 | 7/2014 | Chang et al. |
| 8,862,921 B1 | 10/2014 | Kim et al. |
| 9,864,398 B2 | 1/2018 | Payne |
| 10,133,298 B2 * | 11/2018 | Cho .......................... G06F 1/10 |
| 2002/0172304 A1 | 11/2002 | Saze et al. |
| 2003/0198105 A1 | 10/2003 | Yamaguchi et al. |
| 2004/0189363 A1 | 9/2004 | Takano |
| 2007/0080752 A1 | 4/2007 | Smith |
| 2009/0034987 A1 | 2/2009 | Kang et al. |
| 2009/0244043 A1 | 10/2009 | Kasai et al. |
| 2011/0075780 A1 | 3/2011 | Petrovic |
| 2011/0291868 A1 | 12/2011 | Kehl |
| 2011/0298471 A1 | 12/2011 | Kehl et al. |
| 2012/0036417 A1 | 2/2012 | Kehl |
| 2012/0057655 A1 | 3/2012 | Marsili et al. |
| 2014/0062744 A1 | 3/2014 | Smiley et al. |
| 2014/0192665 A1 | 7/2014 | Koike |
| 2015/0188309 A1 | 7/2015 | Lee |

\* cited by examiner

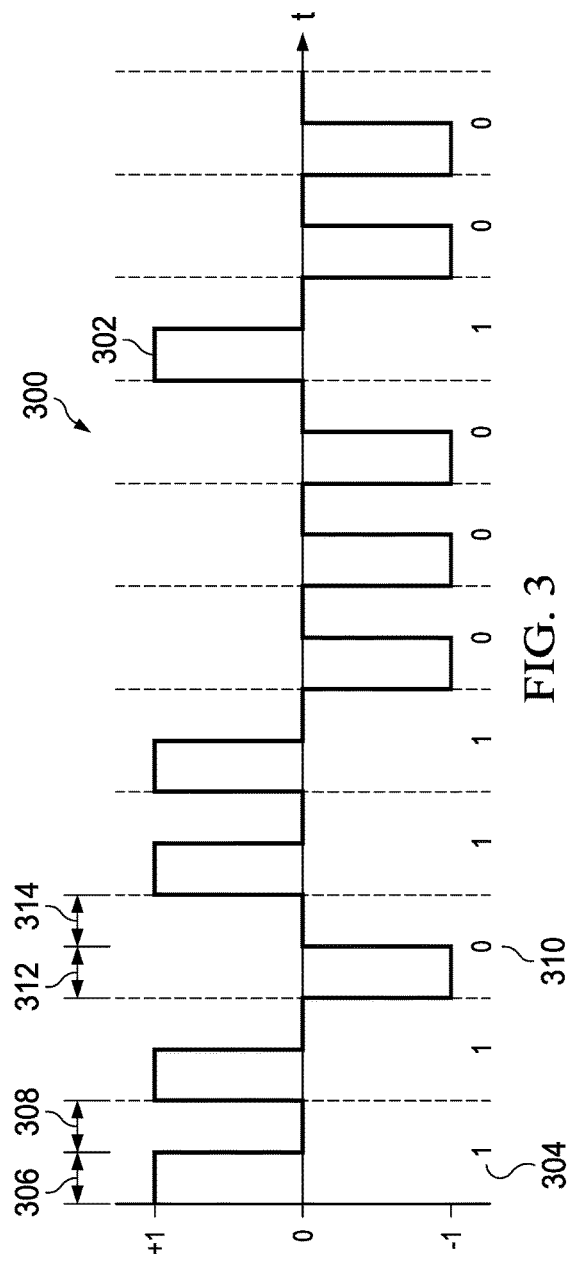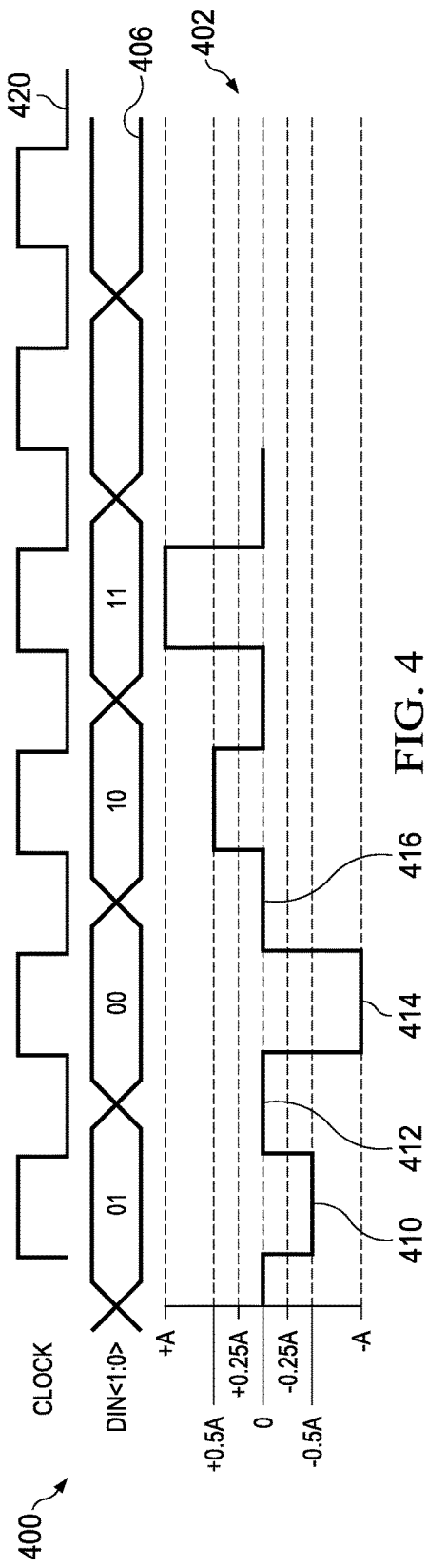

| $V_{IN}$ | D4 | D3 | D2 | D1 | CLOCK | D<1> | D<0> |
|---|---|---|---|---|---|---|---|
| $V_{IN} < -0.75\,A$ | 0 | 0 | 0 | 0 | 0 | 0 | 0 |
| $-0.75\,A \leq V_{IN} < -0.25\,A$ | 1 | 0 | 0 | 0 | 0 | 0 | 1 |
| $-0.25\,A \leq V_{IN} < +0.25\,A$ | 1 | 1 | 0 | 0 | HELD | HELD | HELD |
| $+0.25\,A \leq V_{IN} < +0.75\,A$ | 1 | 1 | 1 | 0 | 1 | 1 | 0 |
| $+0.75\,A \leq V_{IN}$ | 1 | 1 | 1 | 1 | 1 | 1 | 1 |

EMBEDDED CLOCK IN A COMMUNICATION SYSTEM

CROSS REFERENCE TO RELATED APPLICATION(S)

This application is a continuation of U.S. patent application Ser. No. 15/832,882 filed Dec. 6, 2017, which is a divisional of U.S. patent application Ser. No. 14/983,776 filed Dec. 30, 2015 (issued as U.S. Pat. No. 9,864,398), both of which are hereby incorporated herein by reference.

BACKGROUND

Processors, such as digital and mixed-signal processors require digital data communications between various processing, storage, and interface (input/output) subsystems in the processors. As the required data communication rates increase, such as to the terabit/second range, the complexity, area, and power of interface circuits between these subsystems also increases.

At a high level, two techniques are generally used for data communications. The first technique uses many parallel data lines in addition to a clock. The second technique uses serializer/deserializer (SerDes) technology. The parallel data communication technique includes a plurality of buffers for boosting the data signals. The buffers draw large dynamic currents from a power supply, which cause power supply noise due to finite impedance of the power delivery network. Therefore, the parallel communications techniques are not desirable for many high speed communications.

SerDes techniques are very complex and result in significant design effort, consumption of die area, and power. Additionally, the SerDes techniques potentially add many points of failure to the processors in which they are located. The SerDes systems are therefore typically used at the boundaries of circuits for off-die interconnects and are typically not compatible with communications in a die constituting a processor.

SUMMARY

In described examples, transmitter circuitry transmits: a first voltage as the return-to-zero signal that is higher than a first positive threshold, the first voltage being decodable to a first order of data bits; a second voltage as a return-to-zero signal that is between a second positive threshold and the first positive threshold, the second voltage being decodable to a second order of the data bits, and the second positive threshold being lower than the first positive threshold; a third voltage as the return-to-zero signal that is between a first negative threshold and a second negative threshold, the third voltage being decodable to a third order of the data bits, and the second negative threshold being higher than the first negative threshold; and a fourth voltage as the return-to-zero signal that is lower than the first negative threshold, the fourth voltage being decodable to a fourth order of the data bits. Clock circuitry transitions a clock signal for the return-to-zero signal crossing the second positive threshold, and for the return-to-zero signal crossing the second negative threshold.

BRIEF DESCRIPTION OF THE DRAWINGS

FIG. 3 is a diagram of a return-to-zero (RZ) signaling scheme that uses three signaling levels, +1, 0, and −1.

FIG. 4 is a graph showing an example of a RZ signaling scheme having five signal levels to encode two bits of data.

DETAILED DESCRIPTION OF EXAMPLE EMBODIMENTS

Processors, such as digital and mixed-signal processors, use high speed data communications to transfer data between various processing, storage, and interface (input/output) subsystems in the processors. Two techniques are generally used for data communications. The first technique uses many parallel data lines in addition to a clock signal operating on a separate data line. The second technique uses serializer/deserializer (SerDes) technology.

Figure 1:
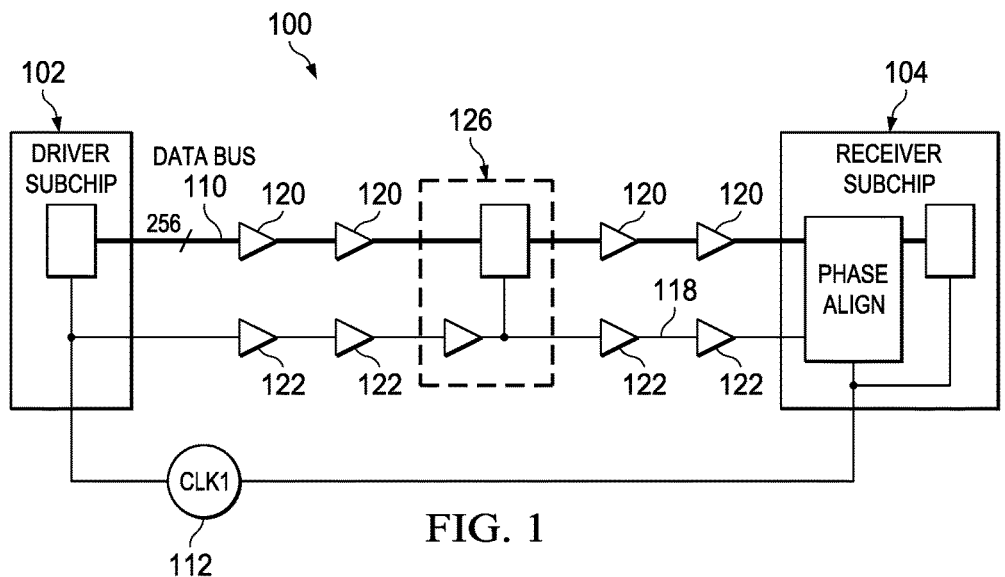
FIG. 1 is a block diagram of a parallel data communication system.

FIG. 1 is a block diagram of a parallel data communication system 100. The system 100 includes a driver subchip 102 and a receiver subchip 104 as may be implemented in a system on chip (SOC) or multi-core processor. Many of the communication techniques described with reference to FIG. 1 additionally apply to systems where data travels off a die between two chips on an integrated system in package (SIP) or between two packaged chips communicating on a system board.

A data bus 110 transmits data between the driver subchip 102 and the receiver subchip 104. In the example of FIG. 1, the data bus 110 is 256 bits wide, meaning that it contains 256 parallel wires or other conductors. A global clock 112 distributes a clock signal to both the driver subchip 102 and the receiver subchip 104. The clock signal is used to "clock out" data and provides a clock signal on a clock line 118 coupled between the driver subchip 102 and the receiver subchip 104.

When the routing distance between the driver subchip 102 and the receiver subchip 104 is large and the data rates on the data bus 110 are high, the parasitic resistance and capacitance on the interconnects between the driver subchip 102 and the receiver subchip 104 limit the bandwidth and maximum data rates. In some examples, when the routing distances are 1.0 mm to 1.5 mm and the data rates are 500 Mb/s to 1500 Mb/s, the parasitic resistance and capacitance on the interconnects between the driver subchip 102 and the receiver subchip 104 limit the bandwidth and maximum data rate on the data bus 110.

In order to improve the data rates, buffers 120 are inserted into the data bus 110 between the driver subchip 102 and the receiver subchip 104 to re-drive the data on the data bus 110. Buffers 122 also re-drive the clock signal on the clock line 118 between the driver subchip 102 and the receiver subchip 104. In some examples, the data bus 110 is re-timed as indicated by the block 126. In some systems, there may be millions of buffers 120, 122 on a single die or chip. This high number of buffers 120, 122, along with the large width of the data bus 110 consumes significant die area. The buffers 120, 122 also consume significant power, reaching over 5 W on some systems. The buffers 120, 122 are typically fabricated with CMOS inverters that have an output voltage swing between 0V and the power supply voltage for the system 100, which is typically 0.8V to 1.2V. Accordingly, the buffers 120, 122 draw large dynamic currents from the power supply, which results in supply noise due to the finite impedance of the power delivery network. Therefore, the use of the buffers 120, 122 is not desirable for high speed data busses.

Figure 2:
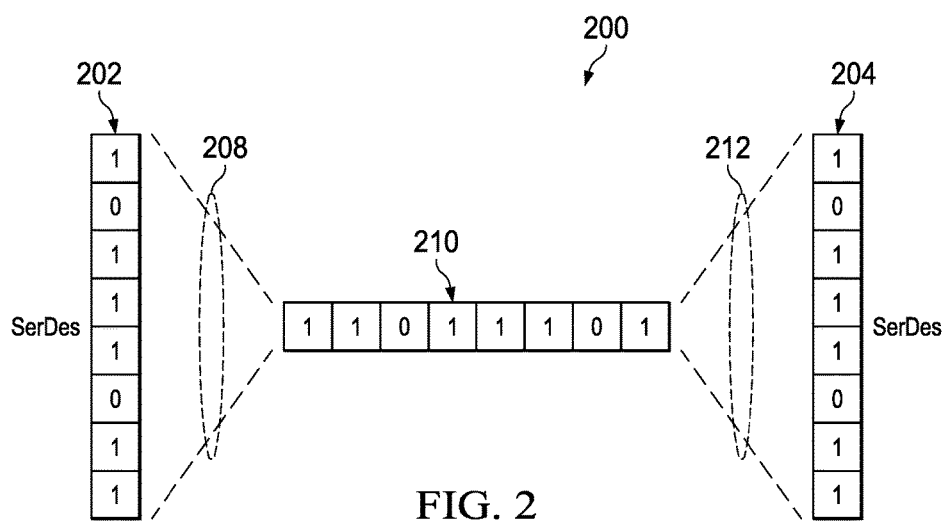
FIG. 2 is a block diagram of a communication system using serializer/deserializer (SerDes) technology.

FIG. 2 is a block diagram of a communication system 200 using serializer/deserializer (SerDes) technology. The system 200 increases data rates by combining multiple streams of lower speed parallel data into single higher speed serial data streams. The system 200 includes a driver subchip 202 and a receiver subchip 204 that output and input parallel data, respectively. In the example of FIG. 2, the parallel data has eight bits or channels. The parallel data generated by the driver subchip 202 is serialized into serial data by a serializer 208. The serial data is transmitted to the receiver subchip 204 by a high speed serial data line 210. The serial data line 210 has to operate at the number of parallel channels faster than the data rate of the parallel channel. The serial data is deserialized to parallel data by a deserializer 212 for processing by the receiver subchip 204.

Some examples of SerDes systems components include clock generation and recovery circuits, data line drivers, test circuits, receivers, and other devices. These SerDes systems are very complex compared to the parallel communication systems. The complexity of SerDes systems results in significant design effort, consumption of die area and power, and potentially adds many points of failure in the system 200. These systems are therefore typically used at the boundaries of chips for off-die interconnects and are rarely used in on-die communication.

The circuits and methods described herein eliminate the receiver SerDes functions and embed the clock signal in the data stream using return to zero (RZ) multi-level signaling. Conventional SerDes systems use a non-return-to-zero (NRZ) signaling scheme where the data signal is represented by two binary levels. At the receiver, a clock recovery circuit (CDR) examines the incoming data signal and locks a clock signal onto the transitions embedded in the incoming data signal. This CDR consumes significant die area and design effort, is prone to false lock, and has a finite clock tracking bandwidth. Furthermore, the CDR performance is limited by jitter between the recovered clock signal and the incoming data signal. Accordingly, the NRZ signaling scheme requires significant die area, adds latency to the system, and has inefficiencies. For example, one popular encoding technique is 8B10B signaling, where 8 bits of data are encoded into a 10b data word. This coding technique guarantees a certain transition density and ensures DC balanced signals, but as the name implies, it carries a 25% overhead (10/8=1.25).

Some of the problems described above are alleviated by a return to zero (RZ) signaling scheme with multiple signaling or voltage levels. FIG. 3 is a diagram 300 of a RZ signaling scheme that uses three signaling levels, +1, 0, and −1, which may be normalized voltages, to transmit a data signal 302. The data signal 302 includes a plurality of one bits (logic one) and zero bits (logic zero) as described below. A one bit 304 is transmitted as a +1 voltage for a period 306 followed by a return to zero for a period 308. A zero bit 310 is transmitted as a −1 voltage for a period 312 followed by a return to zero for a period 314. One of the advantages of RZ signaling is that there is always a transition to zero in the data signal 302 regardless of whether the data signal 302 has a transition between one bits and zero bits. The disadvantage of conventional RZ signaling is that it consumes twice the signal bandwidth as conventional signaling. For example, each bit in the data signal 302 requires the data signal 302 to transition to +1 or −1 and back to zero, so the bandwidth of the data signal 302 is twice the bandwidth of the data rate.

The RZ signaling described herein has five or more signal levels or voltage levels to encode both the clock signal and data signal onto a differential pair of wires or conductors. The additional signal levels enables the encoding of additional bits of information.

FIG. 4 is a graph 400 showing an example of a RZ signal 402 having five signal levels or voltage levels to encode two bits of data. As shown in FIG. 4, the RZ signal 402 has five discrete signal levels that are normalized to +A, +0.5 A, 0, −0.5 A, and −A. Four of these signal levels, +A, +0.5 A, −0.5 A, and −A encode the two data bits in a data signal 406. Signal levels of +0.25 A and −0.25 A are noted and are thresholds to trigger a clock signal transition described below. In the example of FIG. 4, a signal level of +A in the RZ signal 402 encodes the data signal 406 with data bits of one, one. A signal level of +0.5 A in the RZ signal 402 encodes the data signal 406 with data bits one, zero. A signal level of −0.5 A in the RZ signal 402 encodes the data signal 406 with data bits zero, one. A signal level of −A in the RZ signal 402 encodes the data signal 406 with data bits zero, zero. Accordingly, every signal level of the RZ signal 406 encodes two data bits.

The RZ signal 402 returns to the zero level between adjacent transmitted data bits as shown by the graph 400. The crossing of the RZ signal 402 at +0.25 A and −0.25 A defines the clock transitions. At a period 410, the RZ signal 402 is at −0.5 A and returns to zero during a period 412. The RZ signal 402 drops to −A during a period 414 and again returns to zero during a period 416. When the RZ signal 402 transitions through the −0.25 A level between the period 410 and the period 412, the clock signal 420 transitions from high to low. The clock signal 420 remains low during the period 412. As the RZ signal 402 passes through the −0.25 A level, between the period 412 and the period 414, the clock signal 420 transitions high. Accordingly, the clock signal 420 transitions from low-to-high once for every two bits of data on the data signal 404.

In the example of FIG. 4, the clock signal 420 transitions low when the magnitude of the signal level is decreasing as it passes through either the −0.25 A level or the +0.25 A level. Likewise, the clock signal 420 transitions high when the magnitude of the signal level is increasing as it passes through either the −0.25 A level or the +0.25 A level. In other examples, the clock signal 420 may transition high as the magnitude of the signal level decreases. In such an example, the clock signal may transition low as the magnitude of the signal level increases.

Figure 5:
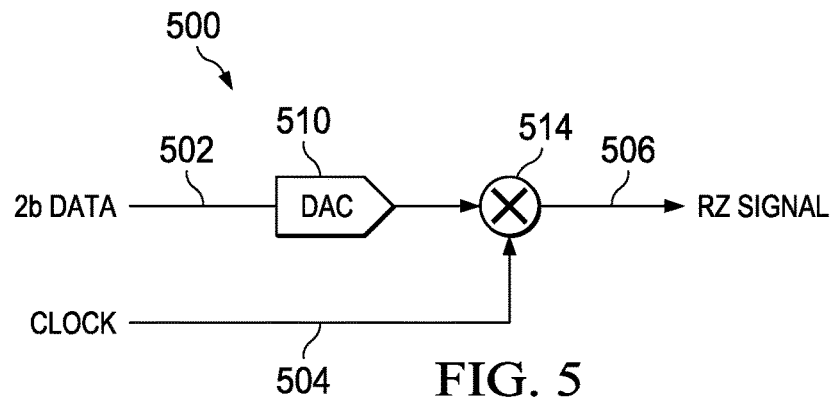
FIG. 5 is a block diagram of an example transmitter that generates the RZ signal of FIG. 4.

FIG. 5 is a block diagram of an example transmitter 500 that generates the RZ signal 402 of FIG. 4. The transmitter 500 includes a data input 502 that receives two bit data. For example, the data input 502 may have parallel conductors for receiving two data bits, such as parallel data bits. A clock input 504 is coupled to a clock signal and receives the clock signal associated with the data received at the data input 502. The RZ signal is output on a RZ signal output 506.

A modified two bit digital-to-analog converter (DAC) 510 produces the four signal levels of the RZ signal 402 of FIG. 4. The modified two bit DAC 510 is an example of a device for producing the RZ signal 402, other devices may be used in place of the DAC 510. The RZ signal 402 has a peak to peak level of 2 A. Many conventional two bit DACs produce analog outputs of −A, −A/3, +A/3, and +A. The example DAC 510 is configured to provide analog outputs of −A, −A/2, +A/2, +A. The output of the DAC 510 is multiplied by the clock signal by a multiplier 514. The multiplication of the output of the DAC 510 by the clock signal provides the additional RZ signal level of zero. The output 506 has the voltages of the RZ signal 402 and is coupled to wires or conductors that transmit the RZ signal to a receiver.

Figure 6:
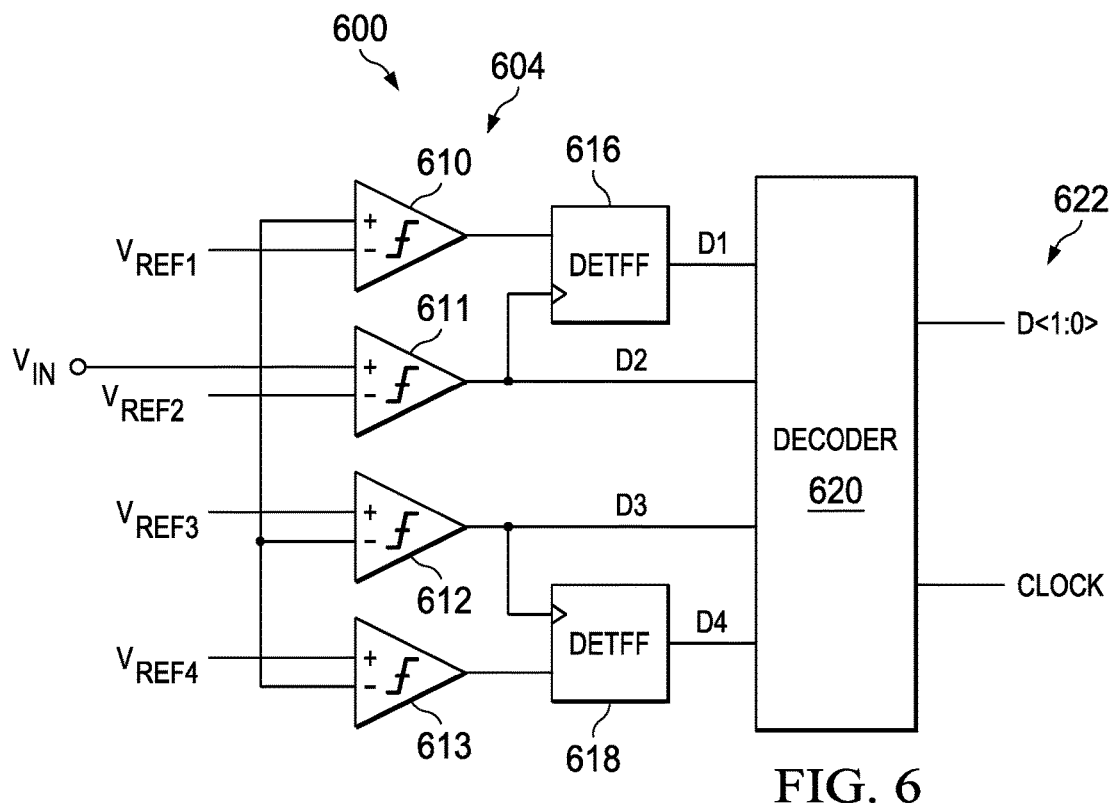
FIG. 6 is block diagram of an example receiver that receives and decodes the RZ signal of FIG. 4.

FIG. 6 is a block diagram of an example receiver 600 that converts the RZ signal 402, FIG. 4, to the data signal 406. The RZ signal 402 is received at a voltage input $V_{IN}$ of the receiver 600. The RZ signal 402 is sometimes referred to as the input signal. The receiver 600 includes a plurality of comparators that are referred to collectively as the comparators 604. The comparators 604 compare the RZ signal 402 to various reference voltages as described below. A first comparator 610 has a non-inverting input coupled to the voltage input $V_{IN}$ and an inverting input coupled to a first reference voltage $V_{REF1}$. In the examples described herein, the first reference voltage $V_{REF1}$ has a value of +0.75 A. A second comparator 611 has a non-inverting input coupled to the voltage input $V_{IN}$ and an inverting input coupled to a second reference voltage $V_{REF2}$. In the examples described herein, the second reference voltage $V_{REF2}$ is +0.25 A. A third comparator 612 has a non-inverting input coupled to the voltage input $V_{IN}$ and an inverting input coupled to a third reference voltage $V_{REF3}$. In the examples described herein, the third reference voltage $V_{REF2}$ is −0.25 A. A fourth comparator 613 has a non-inverting input coupled to the voltage input $V_{IN}$ and an inverting input coupled to a fourth reference voltage $V_{REF4}$. In the examples described herein, the fourth reference voltage $V_{REF4}$ is −0.75 A.

The receiver 600 includes two flip-flops 616 and 618 having inputs coupled to the outputs of the first comparator 610 and the fourth comparator 613 respectively. In some examples, the flip-flops 616 and 618 are double edge triggered flip-flops (DETFFs). The trigger or select inputs of the flip-flops 616 and 618 are coupled to the outputs of the second and third comparators 611 and 612, respectively. The outputs of the flip-flops 616 and 618 and the outputs of the second and third comparators 611 and 612 are coupled to inputs of a decoder 620. The decoder 620 has outputs 622 for data bits and the clock signal. As described above, the data signal consists of two bits, which may be parallel data, for every discrete voltage level received at the voltage input $V_{IN}$. It is noted that the receiver 600 does not require a clock recovery circuit (CDR) because the clock signal is embedded within the RZ signal received at the voltage input $V_{IN}$.

Referring again to FIG. 6, the comparators 610, 611, 612, 613 have thresholds set by their respective reference voltages. The reference voltages of the first and fourth comparators 610 and 613 are +0.75 A and −0.75 A respectively. The second and third comparators 611 and 612 detect the crossing of the RZ signal at the voltage input $V_{IN}$ to latch the outputs of the first and fourth comparators 610 and 613. Accordingly, the reference voltages of the second and third comparators 611 and 612 are set at +0.25 A and −0.25 A, respectively.

Figures 7, 8:
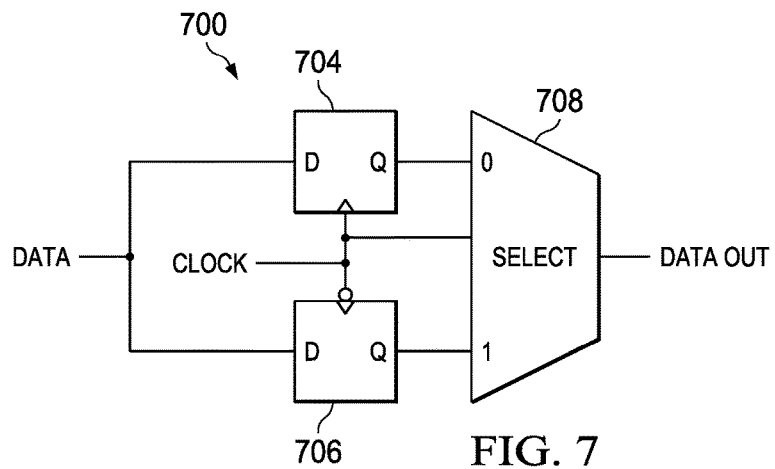
FIG. 7 is a block diagram of a double edge triggered flip-flop from the receiver of FIG. 6.
FIG. 8 is a chart describing output data decoded by the receiver of FIG. 6.

FIG. 7 is a block diagram of a DETFF 700 that is representative of the flip-flops 616 and 618 from FIG. 6. The DETFF 700 uses the clock signal operating at a frequency f to register the data at the input of the flip-flop operating at a frequency 2f. For example, the data could operate or transfer at a rate of 2.0 Gbps and the clock may operate at 1.0 GHz. The DETFF 700 includes a first D/Q flip-flop 704, a second D/Q flip-flop 706, and a multiplexor 708. The clock signal is coupled to the selection of the flip-flops 704 and 706, wherein the clock signal is inverted into the second flip-flop 706. The clock signal is also the selection input for the multiplexor 708. When the clock signal transitions high, the data at the first flip-flop 704 is passed to the output designated DATA OUT. When the clock signal transitions low, the data at the second flip-flop 706 is passed to the output designated DATA OUT. Accordingly, the data is passed on every clock signal transition.

FIG. 8 is a chart 800 describing output data decoded by the receiver 600 of FIG. 6. The $V_{IN}$ column shows various voltage levels in the RZ signal received at the voltage input $V_{IN}$ of the receiver 600. Additional reference is made to the graph 400 of FIG. 4 to describe the clock signal 420 and the data signal 406. When $V_{IN}$ is less than −0.75 A, the outputs of all the comparators 610-613 are logic zero because $V_{IN}$ is less than all the reference voltages. All the inputs to the decoder 620 are logic zero, so data1 (D<1>) is logic zero and data0 (D<0>) is logic zero. In addition, the clock signal is logic zero. When $V_{IN}$ is greater than or equal to −0.75 A and less than −0.25 A, the fourth comparator 613 outputs logic one and the remaining comparators output logic zero. In this state, data1 is zero, data0 is one, and the clock signal is zero. When $V_{IN}$ is greater than or equal to −0.25 A and less than +0.25 A, then both the third comparator 612 and the fourth comparator 613 output logic one. The first comparator 610 and the second comparator 611 output logic zero. The decoder 620 holds the data outputs and the clock outputs at their previous values. In this state, the RZ signal has returned to zero.

When $V_{IN}$ is greater than or equal to +0.25 A and less than +0.75 A, all the comparators except the first comparator 610 output logic one. The decoder 620 decodes the comparator outputs as data1 equal to one, data0 equal to zero, and the clock signal equal to one. When $V_{IN}$ is greater than or equal to +0.75 A, all the comparators output logic one. The decoder 620 decodes the comparator outputs as data1 equal to one, data0 equal to one, and the clock signal equal to one. With reference to the chart 400 of FIG. 4, the decoder 620 decodes the RZ signal to generate the data signal 406 and the clock signal 420 using five voltage levels. To increase the number of data bits communicated beyond two, the number of voltage levels is increased. This can be expressed as n bits require $2^n$ voltage levels sent by the DAC and a corresponding $2^n$ reference voltages and comparators in the receiver.

The circuits and methods described above have no encoding overhead; rather, the encoding is achieved via simple comparisons of the RZ signal to reference voltages. In addition, the circuits and methods do not require clock and data recovery circuits and latency is minimized. The circuits and methods are easily implemented and consume less power and die area than conventional circuits and methods due to the reduced circuit complexity.

Figure 9:
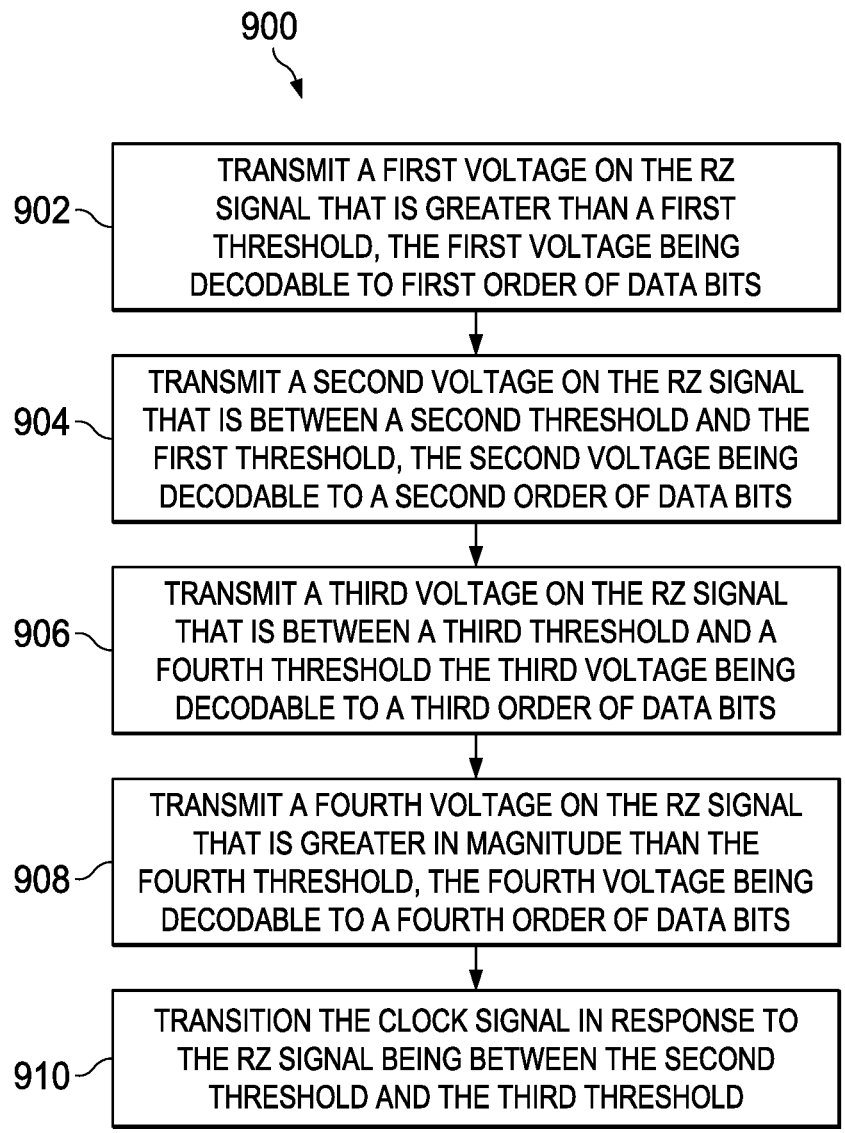
FIG. 9 is a flowchart describing a method for transmitting a plurality of data bits and a clock signal on a (RZ) signal.

FIG. 9 is a flowchart 900 describing a method for transmitting a plurality of data bits and a clock signal on a return to zero (RZ) signal. The method includes transmitting a first voltage on the RZ signal that is greater than a first threshold, the first voltage being decodable to first order of data bits at step 902. The method includes transmitting a second voltage on the RZ signal that is between a second threshold and the first threshold, the second voltage being decodable to a second order of data bits at step 904. In step 906, a third voltage transmitted on the RZ signal that is between a third threshold and a fourth threshold, the third voltage being decodable to a third order of data bits. Step 908 includes transmitting a fourth voltage on the RZ signal that is greater in magnitude than the fourth threshold, the fourth voltage being decodable to a fourth order of data bits. Step 910 includes transitioning the clock signal in response to the RZ signal being between the second threshold and the third threshold.

Modifications are possible in the described embodiments, and other embodiments are possible, within the scope of the claims.

What is claimed is:

1. A method of transmitting data bits and a clock signal as a return-to-zero signal, the method comprising:
from transmitter circuitry, transmitting a first voltage as the return-to-zero signal that is higher than a first positive threshold, the first voltage being decodable to a first set of the data bits;
from the transmitter circuitry, transmitting a second voltage as the return-to-zero signal that is between a second positive threshold and the first positive threshold, the second voltage being decodable to a second set of the data bits, and the second positive threshold being lower than the first positive threshold;
from the transmitter circuitry, transmitting a third voltage as the return-to-zero signal that is between a first negative threshold and a second negative threshold, the third voltage being decodable to a third set of the data bits, and the second negative threshold being higher than the first negative threshold;
from the transmitter circuitry, transmitting a fourth voltage as the return-to-zero signal that is lower than the first negative threshold, the fourth voltage being decodable to a fourth set of the data bits; and
transitioning the clock signal for the return-to-zero signal crossing the second positive threshold or the second negative threshold.

2. The method of claim 1, wherein a value of zero volts is between the second positive threshold and the second negative threshold.

3. The method of claim 1, wherein transitioning the clock signal includes:
transitioning the clock signal to a logic zero for the return-to-zero signal decreasing as it crosses the second positive threshold or increasing as it crosses the second negative threshold; and
transitioning the clock signal to a logic one for the return-to-zero signal increasing as it crosses the second positive threshold or decreasing as it crosses the second negative threshold.

4. The method of claim 1, wherein transitioning the clock signal includes:
transitioning the clock signal to a logic one for the return-to-zero signal decreasing as it crosses the second positive threshold or increasing as it crosses the second negative threshold; and
transitioning the clock signal to a logic zero for the return-to-zero signal increasing as it crosses the second positive threshold or decreasing as it crosses the second negative threshold.

5. The method of claim 1, wherein the data bits consist of two data bits.

6. The method of claim 1, wherein the return-to-zero signal has a maximum positive amplitude and a maximum negative amplitude, and wherein:
the first positive threshold is between fifty percent and one-hundred percent of the maximum positive amplitude;
the second positive threshold is between zero percent and fifty percent of the maximum positive amplitude;

the second negative threshold is between zero percent and fifty percent of the maximum negative amplitude; and
the first negative threshold is between fifty percent and one-hundred percent of the maximum negative amplitude.

7. Apparatus, comprising:
transmitter circuitry configured to transmit:
a first voltage as a return-to-zero signal that is higher than a first positive threshold, the first voltage being decodable to a first set of data bits;
a second voltage as the return-to-zero signal that is between a second positive threshold and the first positive threshold, the second voltage being decodable to a second set of the data bits, and the second positive threshold being lower than the first positive threshold;
a third voltage as the return-to-zero signal that is between a first negative threshold and a second negative threshold, the third voltage being decodable to a third set of the data bits, and the second negative threshold being higher than the first negative threshold; and
a fourth voltage as the return-to-zero signal that is lower than the first negative threshold, the fourth voltage being decodable to a fourth set of the data bits; and
clock circuitry configured to transition a clock signal for the return-to-zero signal crossing the second positive threshold or the second negative threshold.

8. The apparatus of claim 7, wherein a value of zero volts is between the second positive threshold and the second negative threshold.

9. The apparatus of claim 7, wherein the clock circuitry is configured to transition the clock signal to: a logic zero for the return-to-zero signal decreasing as it crosses the second positive threshold or increasing as it crosses the second negative threshold; and a logic one for the return-to-zero signal increasing as it crosses the second positive threshold or decreasing as it crosses the second negative threshold.

10. The apparatus of claim 7, wherein the clock circuitry is configured to transition the clock signal to:
a logic one for the return-to-zero signal decreasing as it crosses the second positive threshold or increasing as it crosses the second negative threshold; and
a logic zero for the return-to-zero signal increasing as it crosses the second positive threshold or decreasing as it crosses the second negative threshold.

11. The apparatus of claim 7, wherein the data bits consist of two data bits.

12. The apparatus of claim 7, wherein:
the return-to-zero signal has a maximum positive amplitude and a maximum negative amplitude;
the first positive threshold is between fifty percent and one-hundred percent of the maximum positive amplitude;
the second positive threshold is between zero percent and fifty percent of the maximum positive amplitude;
the second negative threshold is between zero percent and fifty percent of the maximum negative amplitude; and
the first negative threshold is between fifty percent and one-hundred percent of the maximum negative amplitude.

* * * * *